United States Patent
Brun (10) Patent No.: US 11,942,818 B2
(45) Date of Patent: Mar. 26, 2024

(54) ARRANGEMENT OF CONVERTERS AND FAST SWITCHES TO PROVIDE BESS AND UPS COMBINED FUNCTION

(71) Applicant: SCHNEIDER ELECTRIC IT CORPORATION, Foxboro, MA (US)

(72) Inventor: Eric Lucien Brun, Sassenage (FR)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/656,951

(22) Filed: Mar. 29, 2022

(65) Prior Publication Data
US 2023/0318351 A1 Oct. 5, 2023

(51) Int. Cl.
*H02J 9/06* (2006.01)

(52) U.S. Cl.
CPC .............. *H02J 9/062* (2013.01); *H02J 9/068* (2020.01)

(58) Field of Classification Search
CPC ...... H02J 9/00; H02J 9/002; H02J 9/06; H02J 9/04; H02J 9/061; H02J 9/062; H02J 9/068
See application file for complete search history.

(56) References Cited

U.S. PATENT DOCUMENTS

| 7,050,312 | B2 * | 5/2006 | Tracy | .................... H02M 7/797 307/66 |
| 2004/0084965 | A1 | 5/2004 | Welches et al. | |
| 2006/0226706 | A1 | 10/2006 | Edelen et al. | |
| 2009/0021079 | A1 * | 1/2009 | Johnson, Jr. | ............. H02J 9/062 307/68 |
| 2011/0085273 | A1 * | 4/2011 | Bengtsson | ............... H02H 3/06 361/65 |
| 2011/0187197 | A1 * | 8/2011 | Moth | ...................... H02J 9/062 307/66 |
| 2016/0366781 | A1 * | 12/2016 | Paatero | ............... H05K 5/0217 |

(Continued)

FOREIGN PATENT DOCUMENTS

KR 20160147430 A 12/2016

OTHER PUBLICATIONS

Extended European Search Report from corresponding European Application No. 23154879.3 dated Aug. 11, 2023.

*Primary Examiner* — Rexford N Barnie
*Assistant Examiner* — Rasem Mourad
(74) *Attorney, Agent, or Firm* — Lando & Anastasi, LLP (57) ABSTRACT

Aspects of the disclosure include a system comprising at least one energy-storage-device connection, a first output connection to be coupled to a main power source providing main power, a second output connection to be coupled to at least one load, a first and second power converter coupled to the at least one energy-storage-device connection, and at least one controller coupled to the power converters and being configured to control the system to connect the power converters to the output connections, control the system to disconnect the first power converter from the second output connection responsive to detecting a fault in the main power, control the first power converter to provide power to the first output connection responsive to detecting the fault in the main power, and control the system to disconnect the second power converter from the first output connection responsive to detecting the fault in the main power.

24 Claims, 6 Drawing Sheets

(56) References Cited

U.S. PATENT DOCUMENTS

| | | |
|---|---|---|
| 2017/0085122 A1 | 3/2017 | Nasiri et al. |
| 2019/0280519 A1* | 9/2019 | Heo ........................ H02M 1/10 |
| 2021/0066958 A1* | 3/2021 | Uda ........................ H02J 3/241 |
| 2021/0111582 A1 | 4/2021 | Livingston |
| 2021/0194275 A1* | 6/2021 | Lee ........................ H02J 9/062 |

* cited by examiner

ARRANGEMENT OF CONVERTERS AND FAST SWITCHES TO PROVIDE BESS AND UPS COMBINED FUNCTION

BACKGROUND

1. Field of the Disclosure

At least one example in accordance with the present disclosure relates generally to power systems.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a backup source of power, such as an energy-storage device.

SUMMARY

According to at least one aspect of the present disclosure, an uninterruptible power supply (UPS) system is provided comprising at least one energy-storage-device connection configured to be coupled to an energy-storage device, a first output connection configured to be coupled to a main power source providing main power, a second output connection configured to be coupled to at least one load, a first power converter coupled to the at least one energy-storage-device connection, a second power converter coupled to the at least one energy-storage-device connection, and at least one controller coupled to the first power converter and the second power converter, the at least one controller being configured to control the UPS system to connect the first power converter and the second power converter to the first output connection and the second output connection, control the UPS system to disconnect the first power converter from the second output connection responsive to detecting a fault in the main power, control the first power converter to provide power to the first output connection responsive to detecting the fault in the main power, and control the UPS system to disconnect the second power converter from the first output connection responsive to detecting the fault in the main power.

In some examples, the first power converter has a first power rating less than a power rating of the at least one load, and the second power converter has a second power rating less than the power rating of the at least one load. In various examples, the UPS system includes a first switch coupled between the first power converter and the second power converter. In at least one example, disconnecting the first power converter from the second output connection and disconnecting the second power converter from the first output connection includes opening the first switch.

In some examples, the at least one controller is further configured to determine whether the fault in the main power has ended within a predetermined amount of time since detecting the fault in the main power, and close the first switch responsive to determining that the fault in the main power has not ended within the predetermined amount of time. In various examples, the UPS system includes a second switch coupled between the first power converter and the first output connection. In at least one example, the first switch closes faster than the second switch.

In some examples, the at least one controller is further configured to determine whether the fault in the main power has ended within a predetermined amount of time since detecting the fault in the main power, close the first switch responsive to determining that the fault in the main power has not ended within the predetermined amount of time, and open the second switch responsive to closing the first switch. In various examples, the at least one controller is further configured to control the first power converter to provide power to the second output connection responsive to opening the second switch.

In at least one example, the at least one controller is further configured to determine whether the fault in the main power has ended within a predetermined amount of time since detecting the fault in the main power, and disconnect the first power converter from the first output connection responsive to determining that the fault in the main power has not ended within the predetermined amount of time. In some examples, the at least one controller is further configured to connect the first power converter to the second output connection responsive to disconnecting the first power converter from the first output connection.

In various examples, the at least one controller is further configured to control the first power converter to provide power to the second output connection in parallel with the second power converter responsive to connecting the first power converter to the second output connection. In at least one example, controlling the first power converter to provide power to the first output connection provides fault-ride-through protection to one or more loads coupled to the first output connection. In some examples, the at least one controller is further configured to control the second power converter to provide power to the second output connection during the fault in the main power.

According to at least one aspect of the disclosure, a non-transitory computer-readable medium storing thereon sequences of computer-executable instructions for controlling an uninterruptible power supply including a first output connection configured to be coupled to a main power source providing main power, a second output connection configured to be coupled to at least one load, a first power converter, and a second power converter is provided, the sequences of computer-executable instructions including instructions that instruct at least one processor to control the uninterruptible power supply to connect the first power converter and the second power converter to the first output connection and the second output connection, control the uninterruptible power supply to disconnect the first power converter from the second output connection responsive to detecting a fault in the main power, control the first power converter to provide power to the first output connection responsive to detecting the fault in the main power, and control the uninterruptible power supply to disconnect the second power converter from the first output connection responsive to detecting the fault in the main power.

In some examples, the uninterruptible power supply includes a first switch coupled between the first power converter and the second power converter, and disconnecting the first power converter from the second output connection and disconnecting the second power converter from the first output connection includes opening the first switch. In various examples, the uninterruptible power supply includes a first switch coupled between the first power converter and the second power converter, and the instructions further instruct the at least one processor to determine whether the fault in the main power has ended within a predetermined amount of time since detecting the fault in the main power, and close the first switch responsive to determining that the fault in the main power has not ended within the predetermined amount of time.

In at least one example, the uninterruptible power supply includes a first switch coupled between the first power converter and the second power converter and a second switch coupled between the first power converter and the first output connection, and the instructions further instruct the at least one processor to determine whether the fault in the main power has ended within a predetermined amount of time since detecting the fault in the main power, close the first switch responsive to determining that the fault in the main power has not ended within the predetermined amount of time, and open the second switch responsive to closing the first switch.

In some examples, the instructions further instruct the at least one processor to control the first power converter to provide power to the second output connection responsive to opening the second switch. In various examples, the instructions further instruct the at least one processor to determine whether the fault in the main power has ended within a predetermined amount of time since detecting the fault in the main power, and disconnect the first power converter from the first output connection responsive to determining that the fault in the main power has not ended within the predetermined amount of time.

In at least one example, the instructions further instruct the at least one processor to connect the first power converter to the second output connection responsive to disconnecting the first power converter from the first output connection. In some examples, controlling the first power converter to provide power to the first output connection provides fault-ride-through protection to one or more loads coupled to the first output connection. In various examples, the instructions further instruct the at least one processor to control the second power converter to provide power to the second output connection during the fault in the main power.

According to at least one example, a method of controlling an uninterruptible power supply including a first output connection configured to be coupled to a main power source providing main power, a second output connection configured to be coupled to at least one load, a first power converter, and a second power converter is provided, the method comprising controlling the uninterruptible power supply to connect the first power converter and the second power converter to the first output connection and the second output connection, controlling the uninterruptible power supply to disconnect the first power converter from the second output connection responsive to detecting a fault in the main power, controlling the first power converter to provide power to the first output connection responsive to detecting the fault in the main power, and controlling the uninterruptible power supply to disconnect the second power converter from the first output connection responsive to detecting the fault in the main power.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

A power grid is connected to one or more loads and one or more power sources to provide power to the one or more loads. In some examples, a power grid may be connected to additional devices configured to support the one or more loads connected to the power grid. For example, such additional devices may include battery-energy-storage systems (BESSs), uninterruptible power supplies (UPSs), and so forth.

A BESS may be configured to exchange power with a power grid to absorb surplus power from the power grid (for example, surplus renewable energy) and inject power to the grid. The BESS may store power in one or more energy-storage devices, such as batteries. For example, a BESS may include a bi-directional AC/DC converter configured to be coupled to a battery or other energy-storage device. The BESS may receive DC power from, or provide DC power to, the energy-storage device, and provide AC power to, or receive AC power from, the power grid.

For example, in a power grid powered at least in part by renewable-energy sources (for example, wind turbines), the BESS may draw and store energy from the power grid when power supply exceeds demand (for example, while wind speeds around the wind turbines are high). The BESS may provide energy to the power grid when, for example, demand exceeds supply from the renewable-energy sources. In this manner, power may be stored for later use when supply exceeds demand.

In some examples, a BESS may also provide backup power to one or more loads when power on the power grid experiences a grid disturbance, such as a voltage sag or blackout. For example, the BESS may draw DC power from the energy-storage device, convert the DC power to AC power, and provide the converted AC power to the power grid to power the one or more loads. In this manner, the BESS may offer fault ride through (FRT) by enabling the BESS to remain connected to the power grid for the duration of a fault, such as a transient voltage sag, thereby "riding through" (that is, remaining connected during) the fault.

A UPS may be configured to provide uninterrupted power to one or more loads. For example, a UPS may be coupled to a main-power source, such as a power grid, and a backup-power source, such as a battery. The UPS may provide power derived from the back-up power source to the one or more loads when, for example, power on the power grid is not acceptable (for example, by being disturbed or unavailable).

Some UPS architectures may be capable of quickly disconnecting critical loads from the power grid when grid power is not acceptable, or may be implemented between the power grid and the critical loads such that the critical loads are substantially always isolated from the power grid. In such architectures, high-quality power may be provided to the critical loads even immediately after a grid disturbance occurs. In some examples, certain BESS architectures (for example, including a single AC/DC converter) may not be configured to provide high-quality power continuously, for example, immediately after a grid disturbance occurs. Accordingly, certain UPSs may be more desirable than BESSs for powering critical loads. However, certain UPS topologies may be more complex and/or include additional components as compared to certain BESSs.

For example, a UPS may include a first DC/AC converter coupled to a power grid and to an energy-storage device, and a second DC/AC converter coupled to a critical load and to the energy-storage device. In this manner, the critical load may be isolated from the power grid. However, the first DC/AC converter and the second DC/AC converter may be isolated from one another. Each of the converters may thus be sized to power their respective loads individually. For example, the first DC/AC converter may be sized to power non-critical loads on the power grid and the second DC/AC converter may be sized to power the critical loads isolated from the power grid. Although such an architecture may enable power to be provided to critical and non-critical loads during power disturbances, the UPS may be larger, more complex, and/or more expensive than certain BESSs, for example.

Example power devices described herein, which may include and/or be referred to as UPSs, can provide similar functionality as existing BESSs and/or existing UPSs with a smaller, less complex, and/or less expensive topology. Example power devices may include and/or be referred to herein as UPSs. In one example, a UPS includes a first DC/AC converter switchably coupled in parallel with a second DC/AC converter. The first DC/AC converter and the second DC/AC converter may have a power rating that is less than (for example, approximately half) a power rating of the loads that the converters are configured to power. The first DC/AC converter and the second DC/AC converter may normally be coupled in parallel such that a combined power rating of the DC/AC converters is substantially equal to or greater than the power rating of the loads.

In the event of a grid fault, the DC/AC converters may be switchably disconnected from one another. The DC/AC converters may be switchably disconnected quickly enough to prevent the grid fault from substantially adversely affecting the critical loads, such as by providing low-quality (for example, caused by the grid fault) power to the critical loads. During the fault, the first DC/AC converter may power the non-critical loads and provides power to the power grid to provide fault ride through. For example, the first DC/AC converter may inject power to the power grid as requested by the power grid during the fault. The second DC/AC converter may power the critical loads. For example, the second DC/AC converter may transition from grid-following operation while operating as a battery-energy-storage system to grid-forming operation to operate as an uninterruptible power supply. After a determined amount of time (for example, a maximum expected duration of a transient fault, as compared to an extended outage), the DC/AC converters may again be switchably coupled in parallel to power the critical loads. In some examples, the determined amount of time may be sufficiently short such that the DC/AC converters are capable of powering the converters' respective loads despite the fact that the power ratings of the DC/AC converters may individually be less than the power ratings of the loads.

If the grid fault remains after the predetermined amount of time (for example, because the grid fault is a non-transient fault, such as a blackout condition), the parallel-connected DC/AC converters may remain decoupled from the non-critical loads and the power grid while remaining coupled to the critical loads. Conversely, if the grid fault no longer exists after the predetermined amount of time (for example, because the grid fault is a transient fault, such as a voltage sag), the parallel-connected DC/AC converters may again be coupled to the non-critical loads in addition to the critical loads. Accordingly, example UPSs may provide similar functionality as known UPSs and/or BESSs in a smaller, less complex, and/or less expensive topology.

Figure 1:
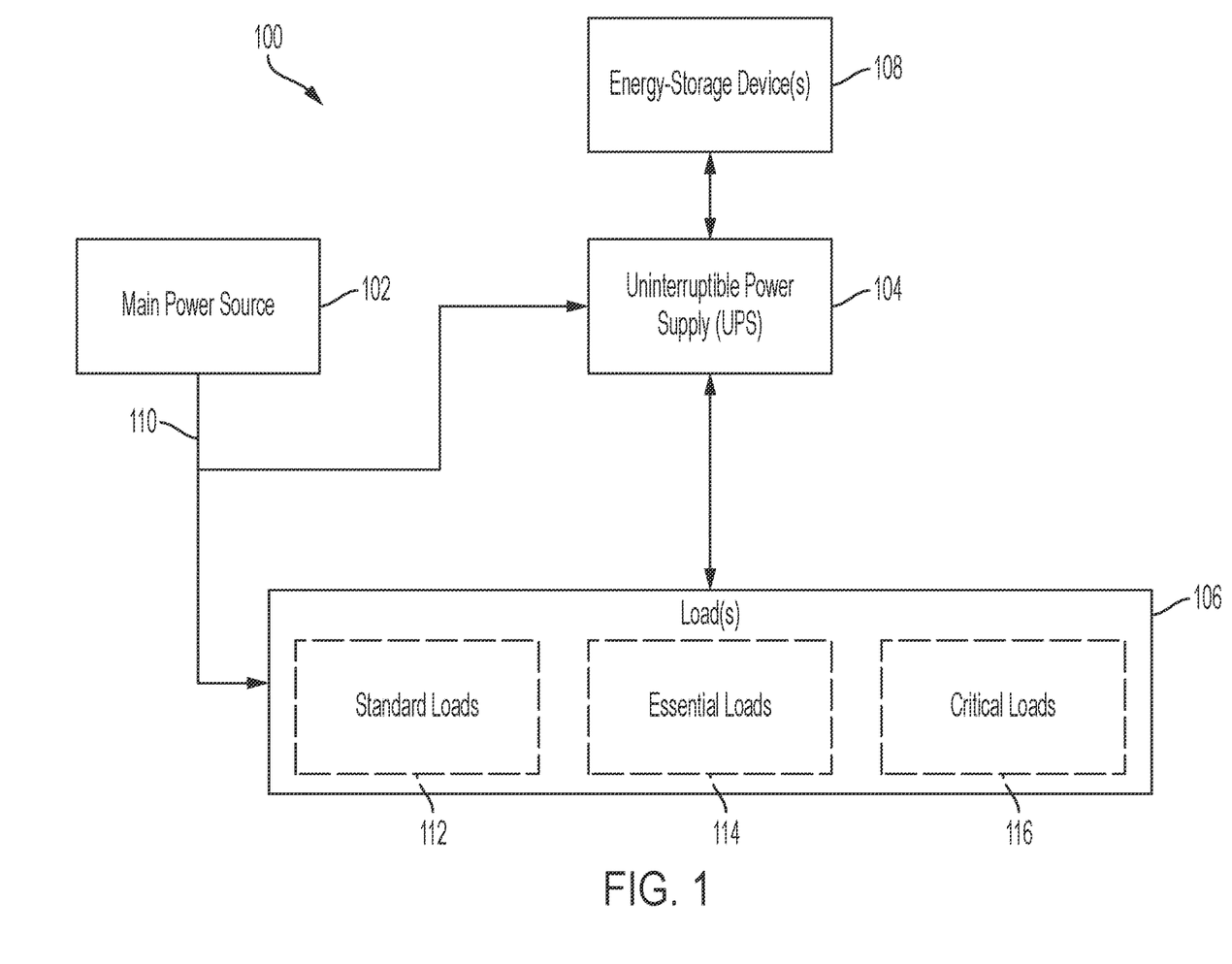
FIG. 1 illustrates a block diagram of a power system according to an example.

FIG. 1 illustrates a block diagram of a power system 100 according to an example. The power system 100 includes at least one main power source 102 ("main power source 102"), at least one uninterruptible power supply (UPS) 104 ("UPS 104"), at least one load 106 ("loads 106"), and at least one energy-storage device 108 ("energy-storage device 108"). It is to be appreciated that components of the power system 100 may perform additional operations than known components having similar names as those of the power system 100. For example, although the UPS 104 may perform operations of an uninterruptible power supply, the UPS 104 may also perform operations of other power devices, such as battery-energy-storage systems.

The main power source 102 is coupled to the UPS 104 and to the loads 106 via a power connection 110. The power connection 110 may be, for example, a power grid. The main power source 102 may include several power sources, such as generators, wind turbines, and so forth, configured to distribute power to one or more devices such as the UPS 104 and the loads 106. The UPS 104 may be coupled to the power connection 110 at a main-power connection, the energy-storage device 108 at an energy-storage-device connection, and to the loads 106 at one or more output connections. The loads 106 may be coupled to the power connection 110 and to the UPS 104 at one or more respective load connections. The energy-storage device 108 may be coupled to the UPS 104.

The loads 106 may include at least one standard load 112 ("standard loads 112"), at least one essential load 114 ("essential loads 114"), and/or at least one critical load 116 ("critical loads 116"). Standard loads may include loads that are powered down if the main power source 102 is no longer able to provide acceptable power (for example, power having parameters within certain ranges, such as by having an AC voltage within a desired range). A standard load may include, for example, a microwave oven. Essential loads may include loads for which fault ride through (FRT) is desired, but for which uninterrupted power is not required (for example, after main power fails but before a backup-power source, such as a generator, starts up). An essential load may include, for example, emergency lights in a commercial building. Critical loads may include loads for which uninterrupted power is desired. A critical load may include, for example, certain medical devices in a hospital.

The main power source 102 may be configured to provide main power to the UPS 104 and to at least one of the loads 106. In some examples, the main power source 102 may provide power directly to the standard loads 112, the essential loads 114, and the critical loads 116. While the main power source 102 provides power to the standard loads 112, the essential loads 114, and the critical loads 116, the UPS 104 may also draw power from the main power source 102 to charge the energy-storage device 108. The UPS 104 may also draw power from the energy-storage device 108 and provide power to the power grid supplying the standard loads 112, the essential loads 114, and the critical loads 116 in conjunction with the main power source 102, for example, by injecting power to the power grid. The UPS 104 may inject power to the loads 106 to increase a power factor of the loads 106, for example.

In the event of a grid fault, the UPS 104 may disconnect the main power source 102 from the critical loads 116 and begin providing uninterrupted power directly to the critical loads 116. The UPS 104 may also provide power to the power grid, the essential loads 114, and/or the standard loads 112 for at least a transient period of time to support FRT. In some examples, the power system 100 may include a switching device (for example, a slow switch) controllable by the UPS 104 and configured to disconnect the essential loads 114 from the main power source 102 and the standard load 112 while maintaining the essential loads 114 connected to the UPS 104 during the grid fault. If the fault lasts for more than a determined amount of time (for example, an expected duration of a transient grid fault, as distinguished from a longer term main-power outage), then the UPS 104 may stop providing power to the essential loads 114 and/or the standard loads 112 and only provide power to the critical loads 116. In this manner, the UPS 104 provides FRT for the essential loads 114 and/or the standard loads 112, and provides uninterrupted power to the critical loads 116.

Figure 2:
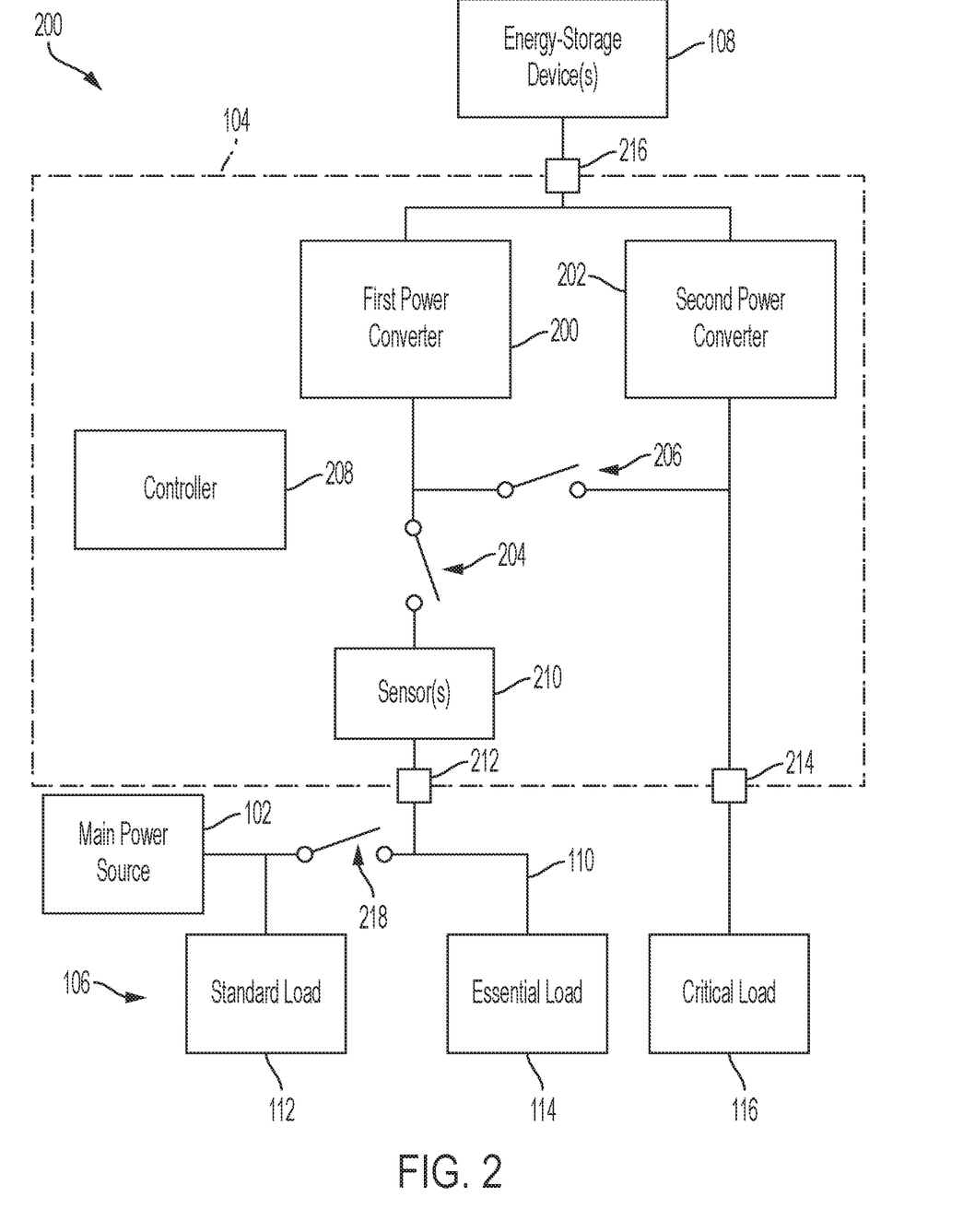
FIG. 2 illustrates a block diagram of the power system according to an example.

FIG. 2 illustrates a block diagram of the power system 100 according to another example. The power system 100 includes the main power source 102, the UPS 104, the loads 106, and the energy-storage device 108. The UPS 104 includes a first power converter 200, a second power converter 202, a first switching device 204, a second switching device 206, at least one controller 208 ("controller 208"), one or more voltage sensors and/or one or more current sensors 210 ("voltage and current sensors 210"), a first power input and/or output connection 212 ("first output connection 212"), a second power input and/or output connection 214 ("second output connection 214"), at least one energy-storage-device connection 216 ("energy-storage-device connection 216"), and a third switching device 218. In some examples, the first power converter 200 and the second power converter 202 may each be implemented as a DC/AC power converter. In other examples, such as examples in which the main power source 102 is configured to provide DC power, the power converters 200, 202 may be implemented as DC/DC power converters.

The first power converter 200 is coupled to the energy-storage-device connection 216 at a first connection, and to the first switching device 204 and the second switching device 206 at a second connection. In examples in which the first power converter 200 is a DC/AC converter, the first power converter 200 may receive and/or provide DC power at the first connection, and may receive and/or provide AC power at the second connection. In various examples, the first power converter 200 may be communicatively coupled to the controller 208.

The second power converter 202 is coupled to the energy-storage-device connection 216 at a first connection, and to the first switching device 204 and the critical loads 116 (via the second output connection 214) at a second connection. In examples in which the second power converter 202 is a DC/AC converter, the second power converter 202 may receive and/or provide DC power at the first connection, and may receive and/or provide AC power at the second connection. In various examples, the second power converter 202 may be communicatively coupled to the controller 208.

The first switching device 204 is coupled to the first power converter 200 and the second switching device 206 at a first connection, is coupled to the voltage and current sensors 210 at a second connection, and is configured to be coupled to the controller 208 at a control connection. In various examples, the first switching device 204 may be considered to be coupled between the first power converter 200 and the first output connection 212. The second switching device 206 is coupled to the first power converter 200 and the first switching device 204 at a first connection, is coupled to the second power converter 202 and the critical loads 116 at a second connection, and is configured to be coupled to the controller 208 at a control connection. In various examples, the second switching device 206 may be considered to be coupled between the first power converter 200 and the second power converter 202.

The switching devices 204, 206 may include one or more switches. In some examples, the second switching device 206 may be implemented as a switching device that is configured to switch relatively quickly, such as a solid-state fast switch (for example, an IGBT, MOSFET, and so forth) or hybrid fast switch, as compared to other switching devices, such as static switches. The first switching device 204 may be implemented as a similar switching device in some examples, or may be implemented as a slower switching device in other examples, such as a relay, SCR, thyristor, and so forth.

The controller 208 is communicatively coupled to the first power converter 200, the second power converter 202, the first switching device 204, the second switching device 206, the voltage and current sensors 210, and the third switching device 218. In some examples, the controller 208 may be communicatively coupled to the energy-storage device 108. In various examples, the controller 208 may send one or more control signals to the power converters 200, 202 to control operation of the power converters 200, 202. The controller 208 may also send one or more control signals to the switching devices 204, 206, 218 to control a switching state of the switching devices 204, 206, 218. A switching state may include, for example, closed and conducting or open and non-conducting. The controller 208 may receive voltage and/or current information from the voltage and current sensors 210. In some examples, the controller 208 may be coupled to at leas one grid controller coupled to the main power source 102 and configured to, for example, request power injection from the UPS 104.

The voltage and current sensors 210 are coupled to the first switching device 204 at a first connection, and to the first output connection 212 at a second connection. The voltage and current sensors 210 may include multiple sensors. The voltage and current sensors 210 may be coupled to the controller 208. The voltage and current sensors 210 may sense voltage and/or current information indicative of a voltage and/or current of the power connection 110 and provide the voltage and/or current information to the controller 208. In some examples, the voltage and current sensors 210 may be implemented at additional or different locations in the UPS 104, such as by being part of one or both of the converters 200, 202. In some examples, the voltage and current sensors 210 may be implemented in a different location in the power system 100, which may be at least partially external to the UPS 104. For example, a first set of one or more sensors may be implemented internal to the UPS 104 and a second set of one or more sensors may be implemented external to the UPS 104. In another example, all of the voltage and current sensors 210 may be implemented external to the UPS 104.

The first output connection 212 is coupled to the voltage and current sensors 210 and to the essential load 114 and the third switching device 218 via the power connection 110. In various examples, the first output connection 212 may receive power from, and provide power to, the power connection 110. For example, the first output connection 212 may receive power from the main power source 102 and/or provide power to the loads 106. Accordingly, no limitation is implied by examples in which the first output connection 212 is referred to as an output connection.

The second output connection 214 is coupled to the second switching device 206 and the second DC/AC converter 202 and to the critical loads 116. In various examples, the second output connection 214 may receive power from, and provide power to, the critical loads 116. For example, the second output connection 214 may receive power from the critical loads 116 where, for example, the critical loads 116 include regenerative loads. Accordingly, no limitation is implied by examples in which the second output connection 214 is referred to as an output connection.

The energy-storage-device connection 216 is coupled to the energy-storage devices 108 and to the power converters 200, 202. In various examples, the energy-storage-device connection 216 may receive power from, and provide power to, the energy-storage devices 108. For example, the power converters 200, 202 may provide power to the energy-storage devices 108 via the energy-storage-device connection 216 to recharge the energy-storage devices 108 with energy derived from the main power source 102. In some examples, the power converters 200, 202 may additionally or alternatively draw power from the energy-storage devices 108 via the energy-storage-device connection 216 to discharge power to one or more of the loads 106. In various examples, the energy-storage-device connection 216 may include multiple energy-storage-device connections each coupled to one or more energy-storage devices. In some examples in which the energy-storage-device connection 216 includes multiple energy-storage-device connections, the first power converter 200 is coupled to one or more first energy-storage-device connections, and the second power converter 202 is coupled to one or more second energy-storage-device connections. In other examples, the energy-storage-device connection 216 includes a single energy-storage-device connection configured to be coupled to both of the power converters 200, 202.

The third switching device 218 is coupled to the main power source 102 and the standard load 112 at a first connection, and to the essential load 114 and the first power connection 212 at a second connection. In some examples, the third switching device 218 is optional and may be omitted by being replaced with a short circuit. The third switching device 218 may disconnect the main power source 102 and the standard load 112 from the UPS 104 while enabling the essential load 114 to remain coupled to the UPS 104 via the first power connection 212. In other examples, the third switching device 218 is omitted such that the main power source 102 and the standard load 112 are coupled to the first power connection 212 directly.

The controller 208 may be coupled to the power converters 200, 202 and the switching devices 204, 206, 218 (connections not illustrated for clarity). The controller 208 may control the UPS 104 to operate in one or more modes of operation based on, for example, power received from the main power source 102. For example, the controller 208 may control operate of the converters 200, 202 and/or the switching devices 204, 206, 218 based on the power received from the main power source 102. As discussed in greater detail below, the controller 208 may select a mode of operation of the UPS 104 based at least in part on parameters of main power received from the main power source 102, such as a voltage level of the main power.

Figure 3:
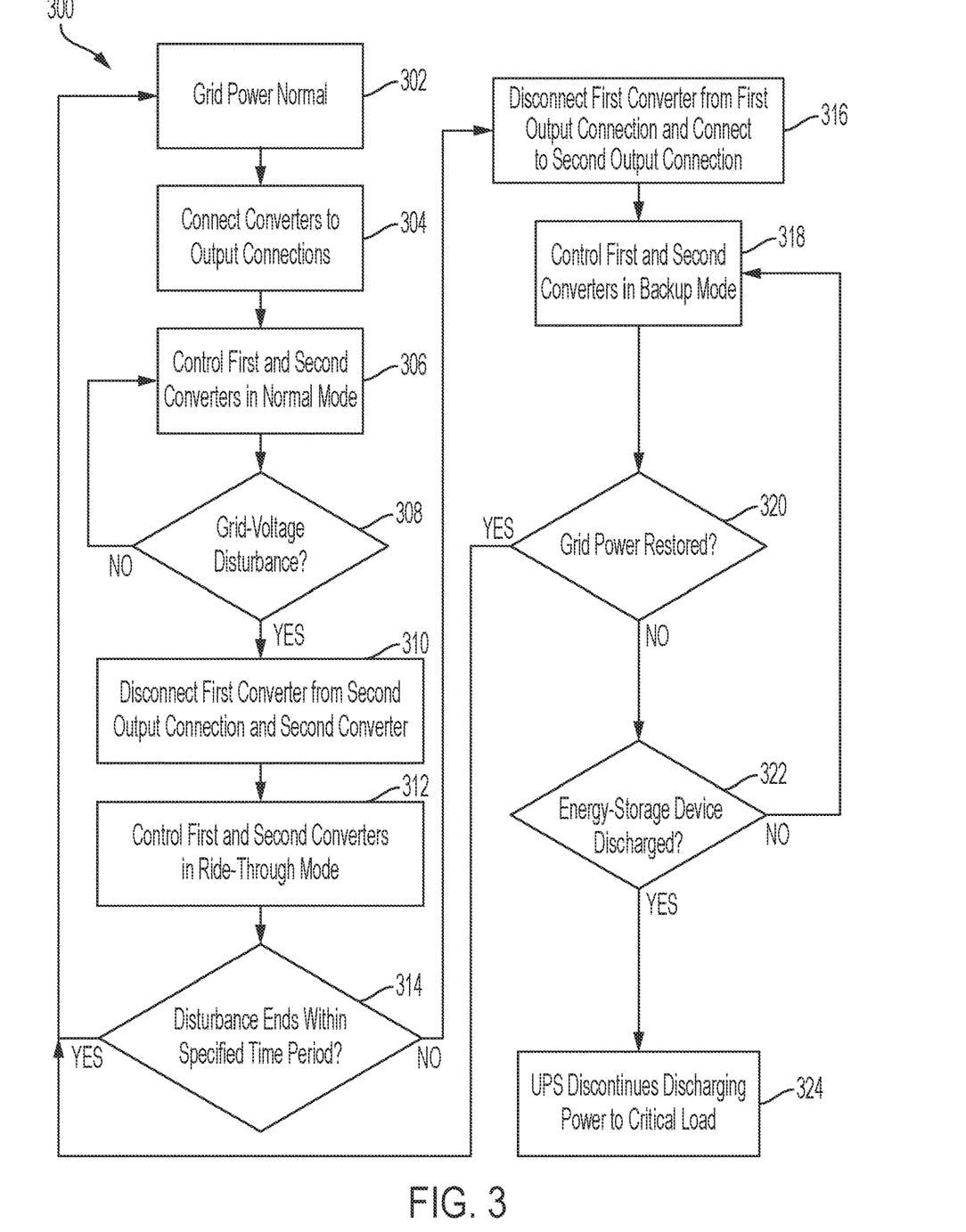
FIG. 3 illustrates a process of operating an uninterruptible power supply according to an example.

FIG. 3 illustrates a process 300 of operating the UPS 104 according to an example. At least a portion of the process 300 may be executed at least in part by the controller 208. For purposes of example, an example of the process 300 is described in which grid power is initially determined to be normal, as discussed below. It is to be appreciated that, in other examples, the process 300 may begin at a different act and/or under different conditions.

At act 302, the controller 208 determines that main power is normal. Main power may refer to power on the power connection 110, which may be provided by the main power source 102. Main power may also be referred to as "grid power" in examples in which the power connection 110 is representative of a power-grid connection. The controller 208 may receive voltage and/or current information (or "power information") from the voltage and current sensors 210. The power information may be indicative of a state and/or parameters of the grid power. The controller 208 may determine a state or parameters of the grid power based on the power information., such as voltage parameters, frequency parameters, and so forth. For example, the controller 208 may determine that the grid power is normal based on a determination that a current and/or voltage of the grid power are within certain expected, normal ranges, as opposed to experiencing voltage spikes and sags, for example.

Figure 4:
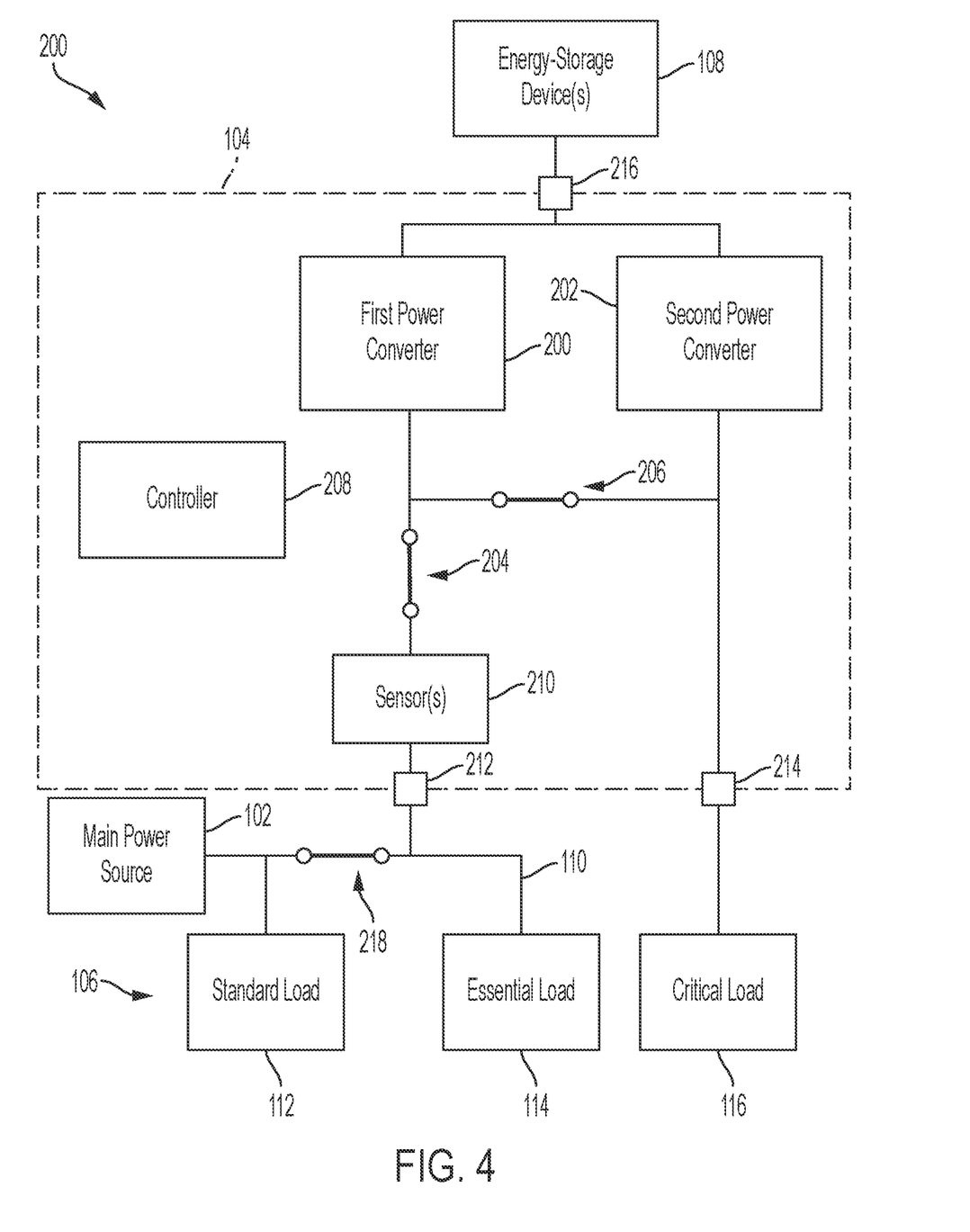
FIG. 4 illustrates a block diagram of the power system according to an example.

At act 304, the controller 208 controls the first switching device 204 and the second switching device 206 to be in a closed and conducting position. The controller 208 may close the switching devices 204, 206 responsive to determining that the grid power is normal at act 302. FIG. 4 illustrates a block diagram of the power system 100 in which the switching devices 204, 206 are in a closed and conducting position. As illustrated by FIG. 4, the power converters 200, 202 are coupled in parallel via the second switching device 206. Accordingly, in some examples, a power output of the parallel-connected power converters 200, 202 may be approximately equal to a sum of the power outputs of the power converters 200, 202. In some examples, the power converters 200, 202 each have a power rating that is half of a power rating of the loads 106. However, while the power converters 200, 202 are coupled in parallel, a combined power rating of the power converters 200, 202 may be substantially equal to or greater than the power rating of the loads 106. In some examples, the controller 208 may also control the third switching device 218 to be in a closed and conducting position at act 304.

At act 306, the controller 208 controls the power converters 200, 202 to operate in a normal mode of operation. In the normal mode of operation, the controller 208 may control the power converters 200, 202 to draw main power from the main power source 102 via the power connection 110 and charge the energy-storage device 108 with the main power. For example, the controller 208 may control the power converters 200, 202 to charge the energy-storage device 108 responsive to determining that a charge level of the energy-storage device 108 is below a threshold charge level. The controller 208 may be communicatively coupled to the energy-storage device 108 to receive charge information from the energy-storage device 108. The charge information may be indicative of a charge level of the energy-storage device 108. Controlling the power converters 200, 202 may include controlling the power converters 200, 202 to draw AC power from the power connection 110, convert the AC power to DC power, and provide the DC power to the energy-storage device 108.

Also, in the normal mode of operation, the controller 208 may also control the power converters 200, 202 to draw backup power from the energy-storage device 108 and provide power derived from the backup power to one or more of the loads 106. For example, the controller 208 may provide power to the loads 106 to improve a power factor of power provided to the loads 106. The controller 208 may receive power information from the voltage and/or current sensors 210 and determine, based on the power information, whether to provide power to the loads 106. In some examples, the controller 208 may exchange information with a grid controller monitoring the power connection 110 and operate based on the received information. For example, the controller 208 may receive a request from the grid controller to provide power to the power connection 110 to provide frequency support, peak power shaving, and so forth.

At act 308, the controller 208 determines whether a grid disturbance is detected. A grid disturbance may be an example of a power fault, or "fault." The controller 208 may determine whether a grid disturbance is present on the power connection 110 based on power information received from the voltage and current sensors 210. The controller 208 may determine whether a grid disturbance is present by determining whether a voltage, current, or parameter derived therefrom (for example, power) meets one or more grid-disturbance criteria. Grid-disturbance criteria may include one or more ranges or thresholds of values. For example, a voltage sag, which may be a type of grid disturbance, may be detected responsive to determining that a voltage on the power connection 110 drops below a certain threshold voltage for more than a threshold amount of time (which may include, for example, zero seconds). Other grid disturbances, such as a current or power falling outside of or within certain ranges, may also be detectable by the controller 208.

If the controller 208 does not detect a grid disturbance (308 NO), then the process 300 returns to act 306. The controller 208 repeatedly controls the converters 200, 202 in the normal mode of operation at act 306 and determines whether a grid disturbance is detected at act 308 until a grid disturbance is detected (308 YES). For example, the controller 208 may repeatedly execute the acts periodically, aperiodically, continuously, and so forth. If a grid disturbance is detected (308 YES), then the process 300 continues to act 310.

At act 310, the controller 208 disconnects the first power converter 200 from the second output connection 214 and disconnects the second power converter 202 from the first output connection 212. For example, the controller 208 may control the second switching device 206 to be in an open and non-conducting position. As discussed above, the second switching device 206 may be a fast-switching device, such as a solid-state breaker, such that the critical loads 116 may be quickly disconnected from the main power source 102 in the event of a grid disturbance. In this manner, the critical loads 116 may be isolated from low-quality power.

Figure 5:
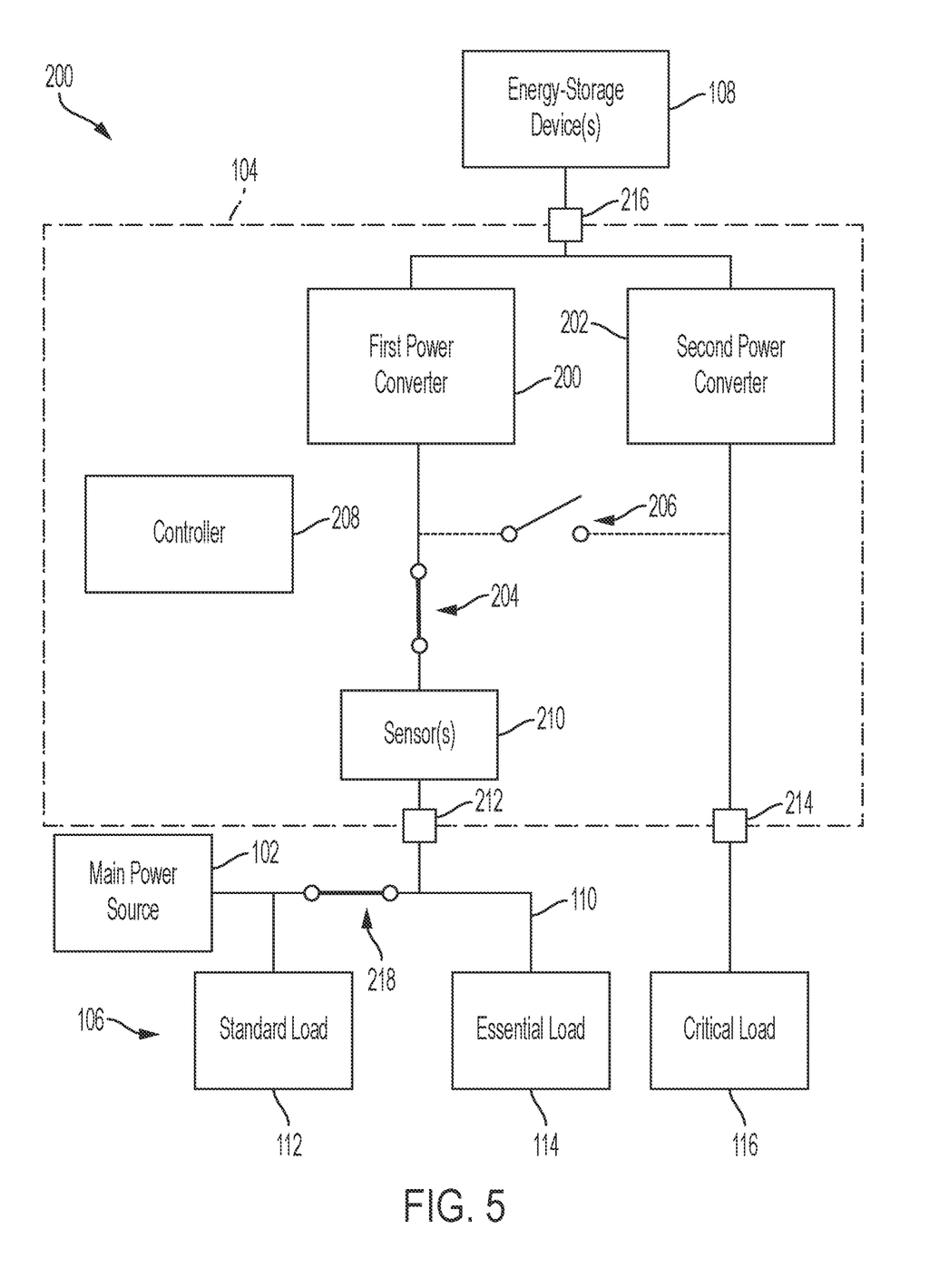
FIG. 5 illustrates a block diagram of the power system according to an example.

FIG. 5 illustrates a block diagram of the power system 100 in which the first switching device 204 is in a closed and conducting position and the second switching device 206 is in an open and non-conducting position. FIG. 5 may therefore illustrate the power system 100 during a grid disturbance. As illustrated by FIG. 5, the power converters 200, 202 are not coupled in parallel when the second switching device 206 is opened. A connection between the power converters 200, 202 via the second switching device 206 is illustrated in dashed lines to indicate that substantially no power passes through the second switching device 206. In some examples, the controller 208 may control the third switching device 218 to be closed and conducting such that the main power source 102 and the standard loads 112, in addition to the essential loads 114, remain coupled to the first power connection 212. In other examples, the controller 208 may control the third switching device 218 to be open and non-conducting such that only the essential loads 114 are coupled to the first power connection 212.

At act 312, the controller 208 controls the power converters 200, 202 to operate in a ride-through mode. The controller 208 may operate the power converters 200, 202 in the ride-through mode during a grid disturbance up to a determined amount of time. For example, the determined amount of time may represent an expected duration of a transient disturbance, as distinguished from a non-transient fault, such as a power outage.

During the ride-through mode, the controller 208 may control the first power converter 200 to provide power to the essential loads 114 and/or the standard loads 112 to provide FRT protection. In some examples, the controller 208 may control the first power converter 200 to provide power only to the essential loads 114, and not the standard loads 112, to provide FRT protection. For example, the controller 208 may control the third switching device 218 to open such that FRT is provided only to the essential loads 114. As discussed above, the essential loads 114 may include loads for which FRT protection is desired, but for which uninterrupted power may not be required. Accordingly, the first power converter 200 may not provide power to the standard loads 112 during a grid disturbance in some examples. In one example, the controller 208 controls the first power converter 200 in a grid-following mode to provide FRT protection.

The controller 208 may also control the second power converter 202 to provide uninterrupted power to the critical loads 116 during the grid disturbance. In one example, the controller 208 controls the second power converter 202 in a grid-forming mode to provide uninterrupted power to the critical loads 116. The controller 208 may continue to control the power converters 200, 202 to power their respective loads in the ride-through mode such that the loads 106 remain powered at least through a transient fault.

At act 314, the controller 208 determines, after a specified time period, whether the grid disturbance has ended. The specified time period may represent an expected duration of a transient grid disturbance, as distinguished from a non-transient fault, such as a power outage. For example, the specified time period may be 100 ms, 200 ms, 250 ms, or another time period. If the controller 208 determines, after the specified time period, that the grid disturbance has ended (314 YES), then the process 300 returns to act 302 and resumes the normal mode of operation. For example, the controller 208 may determine that the grid disturbance has ended responsive to determining that the power information no longer satisfies the criteria of a grid disturbance, as discussed above at act 308. If the controller 208 determines that the grid disturbance has not ended (314 NO), then the process 300 continues to act 316.

At act 316, the controller 208 disconnects the first power converter 200 from the first output connection 212 and connects the first power converter 200 to the second output connection 214. For example, the controller 208 may control the first switching device 204 to be in an open and non-conducting position and the second switching device 206 to be in a closed and conducting position. In some examples, the controller 208 may introduce a delay between opening the first switching device 204 and closing the second switching device 206 to ensure that the first switching device 204 is open before the second switching device 206 is closed, thereby avoiding cross-conduction. As discussed above, in some examples the power converters 200, 202 may each have a power rating that is less than a power rating of the loads 106.

Although the power converters 200, 202 may be capable of providing adequate power to the loads 106 during the grid disturbance in the ride-through mode, the power converters 200, 202 may not be configured to provide power to the loads 106 for significantly longer than the specified time period of act 314 at least in part because of the lower power rating of the power converters 200, 202. Accordingly, at act 316, the first power converter 200 may be disconnected from the power connection 110 via the first switching device 204 and connected in parallel with the second power converter 202 to the critical load 116. As discussed above, a combined power rating of the power converters 200, 202 may be substantially equal to or greater than a power rating of the critical loads 116.

Figure 6:
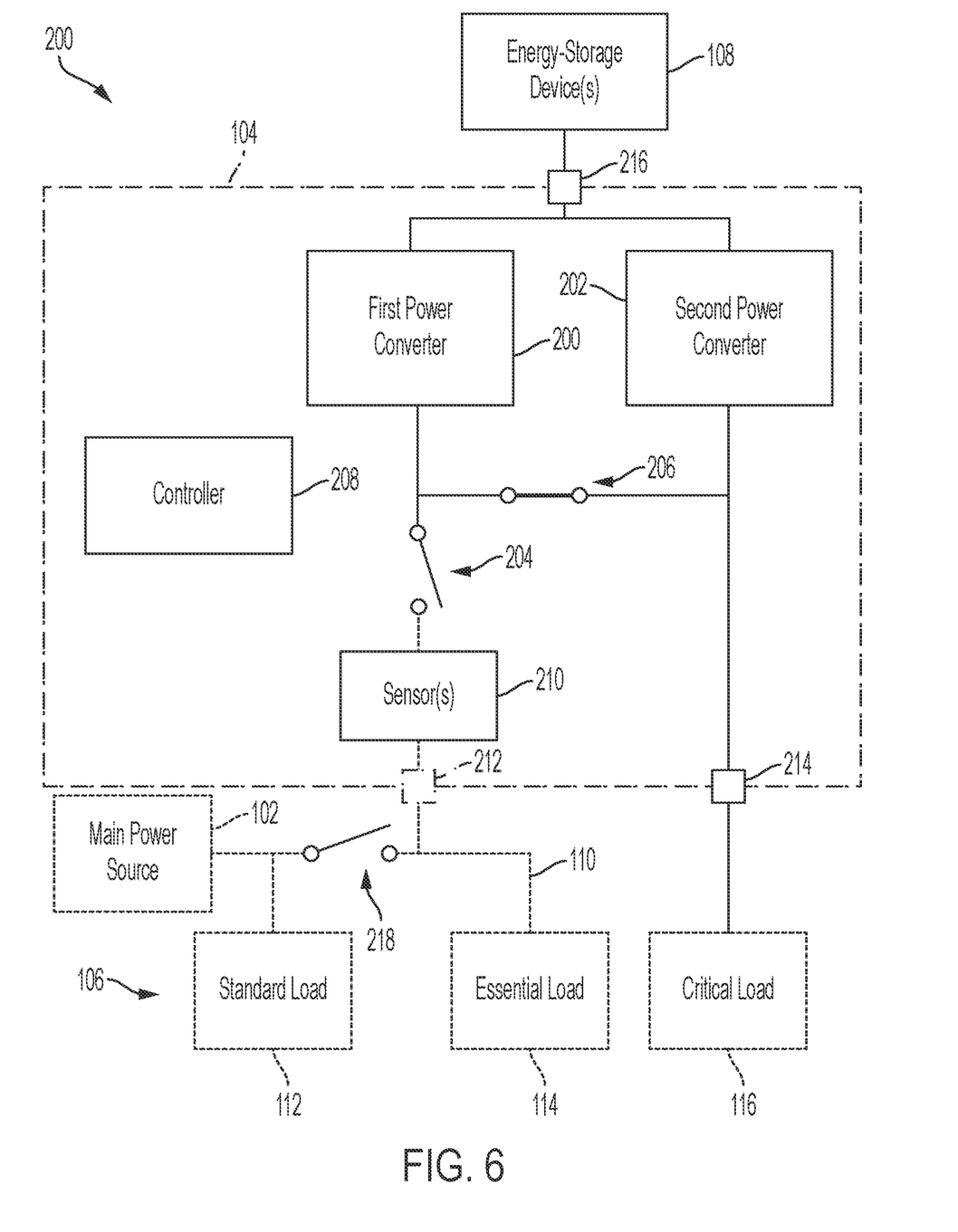
FIG. 6 illustrates a block diagram of the power system according to an example.

At act 318, the controller 208 controls the power converters 200, 202 in a backup mode of operation. FIG. 6 illustrates a block diagram of the power system 100 in the backup mode of operation. As illustrated in FIG. 6, the controller 208 controls the power converters 200, 202 to provide uninterrupted power to the critical loads 116 during the backup mode of operation. Conversely, the standard loads 112 and the essential loads 114 may not receive power. As discussed above, the standard loads 112 and the essential loads 114 may not receive uninterrupted power, although a user may re-classify an essential or standard load as a critical load to provide uninterrupted power to the re-classified load in some examples. Accordingly, the UPS 104 continues to provide uninterrupted power to the critical loads 116 while power is unavailable from the main power source 102. In some examples, the controller 208 controls the third switching device 218 to be open and non-conducting in the backup mode of operation. In other examples, the controller 208 controls the third switching device 218 to be closed and conducting in the backup mode of operation.

At act 320, the controller 208 determines whether main power is restored. The controller 208 may receive power information from the voltage and current sensors 210 and determine, based on the power information, whether main power is restored. The controller 208 may determine that main power is restored responsive to determining that acceptable main power is available via the power connection 110. The controller 208 may evaluate one or more parameters, such as voltage and current, to determine whether the main power is acceptable. For example, the controller 208 may determine whether the one or more parameters fall within one or more desired ranges. If the controller 208 determines that grid power is restored (320 YES), then the process 300 returns to act 302 and again operates in the normal mode, reconnecting the converters 200, 202 to the output connections 212, 214 at act 304. If the controller 208 determines that grid power is not restored (320 NO), then the process 300 continues to act 322.

At act 322, the controller 208 determines whether the energy-storage device 108 is discharged. The energy-storage device 108 may be considered discharged when a charge level of the energy-storage device 108 falls below a discharge level. As appreciated by one or ordinary skill in the art, an energy-storage device may be considered discharged even when some charge remains in the energy-storage device because a complete discharge may adversely affect a state of health of the energy-storage device. Accordingly, the controller 208 may determine that the energy-storage device 108 is discharged even when charge remains in the energy-storage device 108.

In some examples, the controller 208 is communicatively coupled to, and receives charge information from, the energy-storage device 108. The controller 208 may determine whether the energy-storage device 108 is discharged based on the charge information. In some examples, the charge information includes a direct indication that the energy-storage device 108 is discharged. In another example, the charge information includes information that the controller 208 uses to determine whether the energy-storage device 108 is discharged, such as a current state of charge of the energy-storage device 108 which the controller 208 may compare to a discharge threshold. If the controller 208 determines that the energy-storage device 108 is not discharged (322 NO), then the process 300 returns to act 318, and acts 318-322 are repeatedly executed until main power is restored (320 YES) or the energy-storage device 108 is discharged (322 YES). If the energy-storage device 108 is discharged (322 YES), then the process 300 continues to act 324.

At act 324, the controller 208 controls the UPS 104 to stop discharging power to the critical loads 116. The controller 208 may determine that, because main power and stored backup power are unavailable, the UPS 104 may no longer be capable of powering the critical loads 116. Accordingly, the controller 208 may control the power converters 200, 202 to discontinue providing output power to the critical loads 116.

The process 300 may then end. In various examples, the process 300 may begin again at act 302 when main power is again normal.

It is to be appreciated that, although in some examples a UPS (for example, the UPS 104) may include two DC/AC converters (for example, the power converters 200, 202), in other examples the UPS may include more than two DC/AC converters. In some examples, a power rating of each of n DC/AC converters may be sized to be about 1/n of a power rating of loads powered by the UPS. For example, a UPS may include three DC/AC inverters each having a power rating that is approximately one-third of a power rating of loads powered by the UPS.

It is to be appreciated that different switching arrangements than those identified above are within the scope of the disclosure. The principles of the disclosure include any of various switching-device configurations of a UPS in which one or more switching devices disconnect critical loads (for example, critical loads 116) from a power connection (for example, power connection 110) in response to a grid disturbance while continuing to power one or more critical, essential, and/or standard loads (for example, during the grid disturbance). As discussed above, one or more switching devices may be coupled to the UPS but may not be included within the UPS. Similarly, in some examples, the controller 208 may be at least partially external to the UPS 104.

Various controllers, such as the controller 208, may execute various operations discussed above. Using data stored in associated memory and/or storage, the controller 208 also executes one or more instructions stored on one or more non-transitory computer-readable media, which the controller 208 may include and/or be coupled to, that may result in manipulated data. In some examples, the controller 208 may include one or more processors or other types of controllers. In one example, the controller 208 is or includes at least one processor. In another example, the controller 208 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply (UPS) system comprising:
at least one energy-storage-device connection configured to be coupled to an energy-storage device;
a first output connection configured to be coupled to a main power source providing main power;
a second output connection configured to be coupled to at least one load;
a first power converter coupled to the at least one energy-storage-device connection;
a second power converter coupled to the at least one energy-storage-device connection;
at least one switch coupled to the first power converter and the second power converter; and
at least one controller coupled to the first power converter and the second power converter, the at least one controller being configured to
control the at least one switch to connect the first power converter and the second power converter to the first output connection and the second output connection,
control the at least one switch to disconnect the first power converter from the second output connection responsive to detecting a fault in the main power,
control, responsive to detecting the fault in the main power, the first power converter to provide power to the first output connection during an interim period, wherein the interim period lasts for a predetermined amount of time beginning when the fault in the main power is detected,
control the at least one switch to disconnect the second power converter from the first output connection responsive to detecting the fault in the main power,
determine whether the fault in the main power has ended within the predetermined amount of time, and
control, after the interim period and responsive to determining that the fault in the main power has not ended within the predetermined amount of time, the first power converter to provide power to the second output connection in parallel with the second power converter.

2. The UPS system of claim 1, wherein the first power converter has a first power rating less than a power rating of the at least one load, and the second power converter has a second power rating less than the power rating of the at least one load.

3. The UPS system of claim 1, wherein the at least one switch includes a first switch coupled between the first power converter and the second power converter.

4. The UPS system of claim 3, wherein disconnecting the first power converter from the second output connection and disconnecting the second power converter from the first output connection includes opening the first switch.

5. The UPS system of claim 3, wherein the at least one controller is further configured to
close the first switch responsive to determining that the fault in the main power has not ended within the predetermined amount of time.

6. The UPS system of claim 3, wherein the at least one switch further includes a second switch coupled between the first power converter and the first output connection.

7. The UPS system of claim 6, wherein the first switch closes faster than the second switch.

8. The UPS system of claim 6, wherein the at least one controller is further configured to
close the first switch responsive to determining that the fault in the main power has not ended within the predetermined amount of time, and
open the second switch responsive to closing the first switch.

9. The UPS system of claim 8, wherein the at least one controller is further configured to control the first power converter to provide power to the second output connection responsive to opening the second switch.

10. The UPS system of claim 1, wherein the at least one controller is further configured to control the at least one switch to
disconnect the first power converter from the first output connection responsive to determining that the fault in the main power has not ended within the predetermined amount of time.

11. The UPS system of claim 10, wherein the at least one controller is further configured to control the at least one switch to connect the first power converter to the second output connection responsive to disconnecting the first power converter from the first output connection.

12. The UPS system of claim 11, wherein the at least one controller is further configured to control the first power converter to provide power to the second output connection in parallel with the second power converter responsive to connecting the first power converter to the second output connection.

13. The UPS system of claim 1, wherein controlling the first power converter to provide power to the first output connection provides fault-ride-through protection to one or more loads coupled to the first output connection.

14. The UPS system of claim 1, wherein the at least one controller is further configured to control the second power converter to provide power to the second output connection during the fault in the main power.

15. A non-transitory computer-readable medium storing thereon sequences of computer-executable instructions for controlling an uninterruptible power supply including a first output connection configured to be coupled to a main power source providing main power, a second output connection configured to be coupled to at least one load, a first power converter, a second power converter, and at least one switch coupled to the first power converter and the second power converter, the sequences of computer-executable instructions including instructions that instruct at least one processor to:
control the at least one switch to connect the first power converter and the second power converter to the first output connection and the second output connection,
control the at least one switch to disconnect the first power converter from the second output connection responsive to detecting a fault in the main power,
control, responsive to detecting the fault in the main power, the first power converter to provide power to the first output connection during an interim period, wherein the interim period lasts for a predetermined amount of time beginning when the fault in the main power is detected,
control the at least one switch to disconnect the second power converter from the first output connection responsive to detecting the fault in the main power,
determine whether the fault in the main power has ended within the predetermined amount of time, and
control, after the interim period and responsive to determining that the fault in the main power has not ended within the predetermined amount of time, the first power converter to provide power to the second output connection in parallel with the second power converter.

16. The non-transitory computer-readable medium of claim 15, wherein the at least one switch includes a first switch coupled between the first power converter and the second power converter, and wherein disconnecting the first power converter from the second output connection and disconnecting the second power converter from the first output connection includes opening the first switch.

17. The non-transitory computer-readable medium of claim 15, wherein the at least one switch includes a first switch coupled between the first power converter and the second power converter, and wherein the instructions further instruct the at least one processor to
close the first switch responsive to determining that the fault in the main power has not ended within the predetermined amount of time.

18. The non-transitory computer-readable medium of claim 15, wherein the at least one switch includes a first switch coupled between the first power converter and the second power converter and a second switch coupled between the first power converter and the first output connection, and wherein the instructions further instruct the at least one processor to
close the first switch responsive to determining that the fault in the main power has not ended within the predetermined amount of time, and
open the second switch responsive to closing the first switch.

19. The non-transitory computer-readable medium of claim 18, wherein the instructions further instruct the at least one processor to control the first power converter to provide power to the second output connection responsive to opening the second switch.

20. The non-transitory computer-readable medium of claim 15, wherein the instructions further instruct the at least one processor to control the at least one switch to
disconnect the first power converter from the first output connection responsive to determining that the fault in the main power has not ended within the predetermined amount of time.

21. The non-transitory computer-readable medium of claim 20, wherein the instructions further instruct the at least one processor to control the at least one switch to connect the first power converter to the second output connection responsive to disconnecting the first power converter from the first output connection.

22. The non-transitory computer-readable medium of claim 15, wherein controlling the first power converter to provide power to the first output connection provides fault-ride-through protection to one or more loads coupled to the first output connection.

23. The non-transitory computer-readable medium of claim 15, wherein the instructions further instruct the at least one processor to control the second power converter to provide power to the second output connection during the fault in the main power.

24. A method of controlling an uninterruptible power supply including a first output connection configured to be coupled to a main power source providing main power, a second output connection configured to be coupled to at least one load, a first power converter, a second power converter, and at least one switch coupled to the first power converter and the second power converter, the method comprising:
controlling the at least one switch to connect the first power converter and the second power converter to the first output connection and the second output connection;
controlling the at least one switch to disconnect the first power converter from the second output connection responsive to detecting a fault in the main power;

controlling, responsive to detecting the fault in the main power, the first power converter to provide power to the first output connection during an interim period, wherein the interim period lasts for a predetermined amount of time beginning when the fault in the main power is detected;;

controlling the at least one switch to disconnect the second power converter from the first output connection responsive to detecting the fault in the main power, determining whether the fault in the main power has ended within the predetermined amount of time, and controlling, after the interim period and responsive to determining that the fault in the main power has not ended within the predetermined amount of time, the first power converter to provide power to the second output connection in parallel with the second power converter.

* * * * *